US006875409B1

United States Patent
Zhou et al.

(10) Patent No.: US 6,875,409 B1
(45) Date of Patent: Apr. 5, 2005

(54) CATALYST AND PROCESS FOR OXIDATION AND REMOVAL OF NITROGEN OXIDES ($NO_x$) FROM COMBUSTION GASES

(75) Inventors: Bing Zhou, Cranbury, NJ (US); Lap-Keung Lee, West Windsor, NJ (US); Naresh J. Suchak, N. Plainfield, NJ (US)

(73) Assignee: Hydrocarbon Technologies, Inc., Lawrenceville, NJ (US)

( * ) Notice: Subject to any disclaimer, the term of this patent is extended or adjusted under 35 U.S.C. 154(b) by 139 days.

(21) Appl. No.: 10/038,120

(22) Filed: Nov. 9, 2001

Related U.S. Application Data (63) Continuation-in-part of application No. 09/225,082, filed on Jan. 4, 1999, now abandoned.

(51) Int. Cl.[7] ............................................... B01J 23/00
(52) U.S. Cl. ................... 423/239.1; 502/330; 502/331; 502/303; 502/324; 502/328; 502/340
(58) Field of Search ..................... 502/303, 306, 502/308, 313, 318, 319, 324, 328, 331, 338, 339, 345, 340, 349; 423/239.1

(56) References Cited

U.S. PATENT DOCUMENTS 4,110,258 A * 8/1978 Lauder ....................... 502/306
5,795,553 A * 8/1998 Lott et al. .................. 423/213.2
6,066,587 A * 5/2000 Kurokawa et al. ............ 502/66

* cited by examiner

*Primary Examiner*—Steven Bos
*Assistant Examiner*—Edward M. Johnson
(74) *Attorney, Agent, or Firm*—Workman Nydegger (57) ABSTRACT

A bi-functional oxidation catalyst and process for catalytic oxidation and removal of nitrogen oxides ($NO_x$) from combustion gases derived from combustion of carbonaceous fuels such as coal, oil, or natural gas. The bi-functional catalyst includes adsorption and oxidation function metal oxides provided in adjacent close intimate contact by utilizing a binding agent, such as carboxylic acid and calcining to provide a metal oxide complex having a crystalline form. Such nitrogen oxides ($NO_x$) contained in the combustion gases are initially catalytically oxidized to at least about 50 vol % $NO_2$ and some higher oxides by contact with the bi-functional catalyst at 170–550° F. temperature. The combustion gas containing the partially oxidized $NO_x$ is then preferably further chemically oxidized by being mixed with a chemical oxidant such as ozone ($O_3$) in a molar ratio of the chemical oxidant$_3$ to $NO_x$ in the range of 0.5:1–1.2:1 to produce higher oxides of nitrogen such as substantially $N_2O_5$. The further treated combustion gas containing the $N_2O_5$ is next scrubbed with a suitable scrubbing liquid such as water to effectively remove the nitrogen oxides ($NO_x$) and produce a clean treated flue gas stream containing less than about 15 ppm nitrogen oxides and suitable for environmentally safe discharge to the atmosphere.

28 Claims, 4 Drawing Sheets

CATALYST AND PROCESS FOR OXIDATION AND REMOVAL OF NITROGEN OXIDES ($NO_x$) FROM COMBUSTION GASES

This is a continuation-in-part application of Ser. No. 09/225,082, filed Jan. 4, 1999 now abandoned.

BACKGROUND OF INVENTION

This invention pertains to catalytic oxidation and removal of nitrogen oxides ($NO_x$) from exhaust gases derived from combustion of hydrocarbon fuels. It pertains particularly to a bi-functional oxidation catalyst and methods for making same for advantageous use in a treatment process for such oxidation of $NO_x$ contained in combustion exhaust gases, The process utilizes an initial catalytic oxidation step and can be followed by further oxidation by a chemical oxidant such as ozone ($O_3$) for providing essentially complete $NO_x$ oxidation and removal from the combustion gases.

Conventional burning of fossil fuels such as coal, heavy oils and fuel gases to generate heat and energy results in formation of undesired concentrations of nitrogen compounds such as $NO_x$ contained in the resulting combustion exhaust and flue gas streams, and contributes to undesirable air pollution in the atmosphere. At least about 95% of such $NO_x$ in combustion gases is in the form of nitric oxide (NO). Because nitric oxide (NO) is relatively inactive chemically, its removal from combustion flue gas streams by scrubbing with suitable liquids is difficult and inefficient.

Some prior efforts for oxidation of $NO_x$ contained in combustion gases have utilized chemical oxidants such as ozone. For example, U.S. Pat. No. 4,011,298 to Fukui et al discloses oxidation and removal of sulfur oxide and nitrogen oxide (NO) from combustion gases by mixing with an ozone-containing gas. U.S. Pat. No. 4,024,219 to Takahaski et al discloses removing nitrogen oxides in waste gases by oxidizing with nitric acid in presence of a porous adsorbent agent such as silica gel or molecular sieves. U.S. Pat. No. 4,035,470 to Senjo et al discloses removal of sulfur oxides and/or nitrogen oxides from waste gases by adding chlorine dioxide or ozone and scrubbing with an aqueous solution. U.S. Pat. No. 4,351,811 to Matsuda et al discloses removing NO and $NO_2$ contained in exhaust gases by contact with a metallic oxide catalyst together with ammonia. U.S. Pat. No. 4,564,510 to Bechthold et al discloses removing nitrogen oxides from waste gases by oxidizing with an agent such as ozone to form $NO_2$, then adsorbing the $NO_2$. U.S. Pat. No. 4,971,777 to Firnhaber et al discloses removing $SO_x$ and $NO_x$ from industrial furnace exhaust gases containing 0.5 vol % $O_2$ by thermally oxidizing NO at 300–900 C followed by an adsorption step. Also, U.S. Pat. No. 5,206,002 to Skelly et al discloses treating combustion exhaust gases containing oxides of nitrogen and sulfur from an electric power plant by mixing with a chemical oxidant such as ozone ($O_3$). U.S. Pat. No. 5,756,057 to Tsuchitani et al and U.S. Pat. No. 5,759,947 to Zhou disclose catalysts which can be used for removal of nitrogen oxides from combustion gases. However, it is apparent that known processes for oxidation and removal of nitrogen oxides from combustion exhaust or flue gases have generally been ineffective and undesirable, and that use of ozone alone for $NO_x$ oxidation involves undesirably high operating costs. Thus, further improvements in catalysts and processes for removal of $NO_x$ from combustion exhaust and flue gases are needed in industry for effectively reducing air pollution and smog and providing a clean air environment.

It is known that if the $NO_x$ contained in combustion flue gases could be efficiently oxidized to $NO_2$ or $N_2O_5$, substantial amounts of such oxidized nitrogen compounds could then be effectively removed by liquid scrubbing of the treated flue gases. However, because oxidation of nitrogen oxide NO by $O_2$ is very slow, improved methods for such oxidation are needed. Combustion flue gases containing $NO_x$ usually also contains some unreacted oxygen, such as 5–10% by volume. It is believed that such oxidation of $NO_x$ could be substantially enhanced by initial adsorption of the NO and the small concentration of $O_2$ contained in combustion flue gases on a suitable catalytic surface, which also provides simultaneous desorption of an oxidized form of $NO_x$ such as $NO_2$ from the catalytic surface. Such catalytic oxidation step for $NO_x$ could be followed by further chemical oxidation such as with ozone ($O_3$) to form $N_2O_5$. Because the oxidized $NO_x$ has much greater solubility in suitable scrubbing liquids, substantially all of the $NO_x$ contained in combustion exhaust or flue gases could be effectively removed in the form of oxyacids or salts.

SUMMARY OF INVENTION

This invention provides a bi-functional metal oxide catalyst which is effective for simultaneous catalytic adsorption and oxidation of nitrogen oxides ($NO_x$) contained in combustion gases derived from the combustion of hydrocarbon fuels. This bi-functional catalyst composition utilizes specific combinations of active metal oxides which are chemically bonded intimately together so as to form a metal oxide complex having crystalline form or structure which provides both an adsorption function and sites and closely adjacent oxidation function and sites for the $NO_x$ contained in the combustion exhaust or flue gases. Because of its unique composition and structure, this bi-functional catalyst is capable of effectively oxidizing the $NO_x$ to substantially $NO_2$ at desirable high reaction rates and at relatively low reaction temperatures in the range of 170–550° F. These performance characteristics make this bi-functional catalyst particularly useful for treating $NO_x$ containing flue gases from coal-fired or oil-fired industrial furnaces, or from steam generating boilers in electric power plants to at least partially remove the nitrogen oxides from the combustion flue gases.

Metal oxides which are useful for providing the bi-functional catalyst adsorption function and sites include oxides of metals selected from the group including barium (Ba), cesium (Cs), lanthanum (La), strontium (Sr), zirconium (Zr), and combinations thereof. Metals oxides useful for providing the bi-functional catalyst adjacent oxidation function and sites include oxides of transition metals including chromium (Cr), cobalt (Co), copper (Cu), iron (Fe), manganese (Mn), platinum (Pt) and combinations thereof. The adsorption function metal oxides in the bi-functional catalyst are placed in close intimate contact with the oxidation function metal oxides by utilizing a tri-valent acid binding agent having at least two acid functional groups such as carboxylic acid during preparation of the catalyst. The catalyst also has a balanced molar ratio of the adsorption metals to the oxidation metals within a broad ratio range of 0.1:1 to 5:1, with a molar ratio range of 0.2:1 to 2:1 being preferred. For this bi-functional catalyst, the preferred adsorption metals are barium and lanthanum, and the preferred oxidation metals are copper and manganese with small percentage of platinum as a promotor metal. This invention also includes methods steps utilized for making the bi-functional catalyst, which is initially in powder form but can be deposited on a suitable porous support material or structure.

This invention also provides a process for using the bi-functional catalyst for initial catalytic oxidation of nitrogen oxides $NO_x$ contained in combustion exhaust or flue gases derived from the combustion of hydrocarbonaceous fuels such as coal, heavy oils, and natural gas. In such $NO_x$ initial oxidation process, the flue gases derived from the fuel combustion and containing up to about 0.5 vol. % $NO_x$ together with 5–10 vol. % $O_2$ are first contacted by the bi-functional oxidation catalyst of this invention, and for which process the $NO_x$ is adsorbed on the catalytic surface and simultaneously oxidized and desorbed from the catalytic surface at 170–550° F. temperature to provide an oxidized form of NO such as at least about 50 vol. % $NO_2$, and preferably 60–98 vol. % $NO_2$ in the treated combustion gas.

In another embodiment of this invention, the partially oxidized $NO_x$ in the combustion exhaust gas downstream from the initial catalytic oxidation step is then preferably further treated by contact with a supplemental chemical oxidant such as hydrogen peroxide ($H_2 O_2$) or ozone ($O_3$) at reaction temperature of 100–250° F. and 0.5–20 psig pressure for providing additional oxidization reactions for converting the $NO_2$ to higher oxides of nitrogen such as $N_2 O_5$. For this two-step $NO_x$ oxidation process including the initial catalytic oxidation of $NO_x$ to substantially $NO_2$ followed by chemical oxidation to substantially $N_2O_5$, the initial catalytic oxidation step will preferably utilize the bi-functional catalyst of this invention.

The resulting two-step treated combustion flue gas containing the higher oxidized form of $NO_x$ such as mainly $N_2O_5$ is next scrubbed by intimate contact with a suitable aqueous scrubbing liquid such as water to remove the oxidized nitrogen compounds from the gas, after which the resulting treated combustion flue gas containing less than about 15 ppm $NO_x$ is discharged to the atmosphere. The scrubbing liquid is further processed as desired to remove the nitrogen compounds such as nitric acid. By utilizing the initial catalytic oxidation step for treating fuel combustion gases, followed by the subsequent chemical oxidation treatment step, significantly less of the chemical oxidant such as hydrogen peroxide ($H_2 O_2$) or ozone ($O_3$) is required to complete the oxidation of $NO_x$ in the combustion exhaust gases to essentially $N_2 O_5$. Thus, by utilizing the bi-functional oxidation catalyst in an initial catalytic oxidation step of the two-step $NO_x$ oxidation process according to this invention, the nitrogen oxides ($NO_x$) contained in combustion gases derived from hydrocarbon fuel combustion are advantageously and effectively transferred from the exhaust or flue gases to a scrubbing liquid, from which the nitrogen oxides can be effectively removed by other known procedures, and the treated combustion gases containing minimal $NO_x$ less than about 15 ppm are discharged to the atmosphere.

This bi-functional oxidation catalyst and two-step process for oxidation and removal of $NO_x$ from combustion gases is useful for fossil fuel fired steam boilers such as used in electric power plants, and for fired industrial furnaces such as used in chemical, glass and petroleum refinery processes.

DESCRIPTION OF INVENTION

The bi-functional oxidation catalyst according to this invention utilizes a unique composition of active metal oxides in which one or more metal oxides selected for providing an adsorption function and sites are provided in close intimate contact with one or more metal oxides selected for effectively providing simultaneous oxidation function and sites on the catalyst. The intimate contact of the adjacent adsorption and oxidation function metal oxides is provided by utilizing a binding acid agent having at least two functional groups such as a carboxylic acid during preparation of the catalyst, so that after a calcining step the metal oxides are chemically bonded intimately together so as to form a metal oxide complex having a crystalline form or structure. The resulting bi-functional catalyst powder material may be coated/supported onto inert geometric shapes or structures having large surface area of at least about 50 m²/g and preferably 100–500 m²/g which provides low pressure drop for the combustion gases flowing through a catalytic oxidation reactor. The catalyst metal oxides are preferably suitably deposited or embedded onto a stable porous substrate support material such as a ceramic honeycomb structure which is capable of withstanding combustion gas temperatures up to at least about 600° F. or higher. Because the bi-functional catalyst of this invention is able to oxidize NO contained in a fuel combustion gas to mainly $NO_2$ or higher oxides within a desired relatively low temperature range of 170–550° F. and at substantially atmospheric pressure and high space velocity, the catalytic initial oxidation step can be advantageously and conveniently located in commercial electric power plant processes immediately downstream from a particulate solids removal step in the plant boiler section. Accordingly, this bi-functional catalyst and process for utilizing it thereby advantageously avoid any undesired re-heating of the combustion flue gas as would be needed for other oxidation catalysts requiring higher reaction temperatures such as above about 500° F.

The initially oxidized $NO_2$ contained in the combustion flue gas stream is preferably further oxidized in a second oxidation step by being mixed with a sufficient amount of a chemical oxidant such as hydrogen peroxide ($H_2 O_2$) or ozone ($O_3$) to form essentially $N_2 O_5$ at reaction conditions of 100–250° F. temperature, 0.5–5 psig pressure, and a molar ratio of the chemical oxidant to $NO_x$ of 0.5:1 to 1.2:1. Chemical oxidation conditions of 125–225° F. temperature and 0.6–2.0 psig. pressure are usually preferred. Depending upon the percentage catalytic conversion of NO to $NO_2$ achieved in the initial catalytic oxidation step, the molar ratio of hydrogen peroxide ($H_2 O_2$) to $NO_x$ should be in a range of 0.6:1 to 1.10:1 and the molar ratio of ozone ($O_3$) to $NO_x$ should be the range of 0.5:1 to about 1.0:1, with lower percentages of catalytic conversion requiring more of the chemical oxidant. Because of the initial catalytic preoxidation step of NO to form substantially $NO_2$, only about one-third as much of the chemical oxidant such as ozone ($O_3$) is required to complete the oxidation of $NO_2$ to $N_2 O_5$, as would be required if the chemical oxidant was used alone. Thus, this two-step $NO_x$ oxidation and removal process utilizing the combined catalytic and chemical oxidation steps requires significantly lower process costs for achieving substantially complete removal of $NO_x$ from combustion gases and to meet governmental acceptable levels, such as less than about 15 ppm $NO_x$, and preferably less than about 10 ppm $NO_x$ remaining in the treated gases discharged to the atmosphere.

Catalyst Preparation Method

The bi-functional catalyst of this invention is prepared by providing the adsorption function metal components including barium, cesium, lanthanum, strontium, zirconium and combinations thereof, and the oxidation function metals components including chromium, cobalt, copper, iron, manganese and combinations thereof, so as to have a molar ratio of the adsorption function metals to the oxidation function metals in the range of 0.1:1 to 5:1, together with about 1 wt. % platinum provided as an oxidation promoter metal. Also for providing the two catalytic metal sites in closely adjacent positions in the bi-functional catalyst, a binding agent such as carboxylic acid having at least two acid functional groups and having a molar ratio of acid to the total metals between 0.5:1 and 2:1, and preferably 0.8:1 and 1.5:1, is utilized for chemically attaching and bonding the adsorptive and oxidative metals intimately together so as to form a metal oxide complex having a crystalline form or structure with the metals arranged in an orderly repetitive pattern between the adsorption metal oxide component and the oxidation metal oxide component. After an aqueous solution of one or more of the adsorption metal ions is combined with one or more of the oxidation metal ions within the desired molar ratio range, and the binding acid agent added, the resulting metals compound is dried and calcined in air at 500–800° C. (930–1470° F.) temperature for 0.4–5 hours to form a fine powder metal oxide precursor material. Such precursor material is then impregnated with another solution of the oxidation function metals sufficient to provide the desired molar ratio of the adsorption metals to the oxidation metals, and the resulting slurry dried and calcined at 500–800° C. for 0.5–2.0 hours so as to form a metal oxide complex having a crystalline form or structure in which the metal oxides have an orderly repetitive pattern. Suitable carboxylic acid binding agents and their salts are citric acid and sodium citrate.

A typical bi-functional catalyst of this invention can be prepared utilizing specific procedures as follows:

For preparing the precursor solution including adsorption and oxidation metals, 46.9 grams of $BaCuO_2$, 52.3 g of $Ba(NO_3)_2$ and 46.5 g of $Cu(NO_3)_2 \cdot 2.5\ H_2O$ are dissolved in 300 ml distilled water, and 76.9 g citric acid is dissolved in 200 ml distilled water. The mole ratio between the total metal ions and the citric acid is 1:1. The two solutions are mixed together and water is evaporated at about 95° C. (203° F.) until a sol consistency is obtained. The sol is further dried at 70° C. (158° F.) in a vacuum oven, then calcined at about 750° C. (1380° F.) for 0.5 hours in air, and cooled to provide a Ba/Cu precursor material.

This obtained Ba/Cu precursor material is further impregnated by a Mn and Pt solution, for which 12.1 grams of $Mn(NO_3)_2 \cdot 6H_2O$ is dissolved in 100 ml distilled water and 1.2 grams 5% Pt solution (ammonia platinum nitrate) is added to the Mn solution. Then 3 grams of the precursor material is impregnated by the Mn and Pt solution to provide the desired molar ratio of the adsorbent metals to the oxidation metals. The resulting slurry is heated during rotation until dried to a solid powder. The solid powder is further heated and calcined at 750° C. for 0.5 hours in air, then cooled to room temperature in air to provide a bi-functional catalyst in which the adsorption and oxidation metals are chemically bonded together so as to form a metal oxide complex having a crystalline form.

All other bi-functional catalyst samples were prepared using similar procedures for combining the specific adsorption and oxidation metals closely together so to form a metal oxide complex having a crystalline form, as are listed in Table 1 and 2 of the Examples below.

BRIEF DESCRIPTION OF DRAWINGS

This invention will be described further with reference to the following drawings, in which.

DESCRIPTION OF PROCESS

Figure 1:
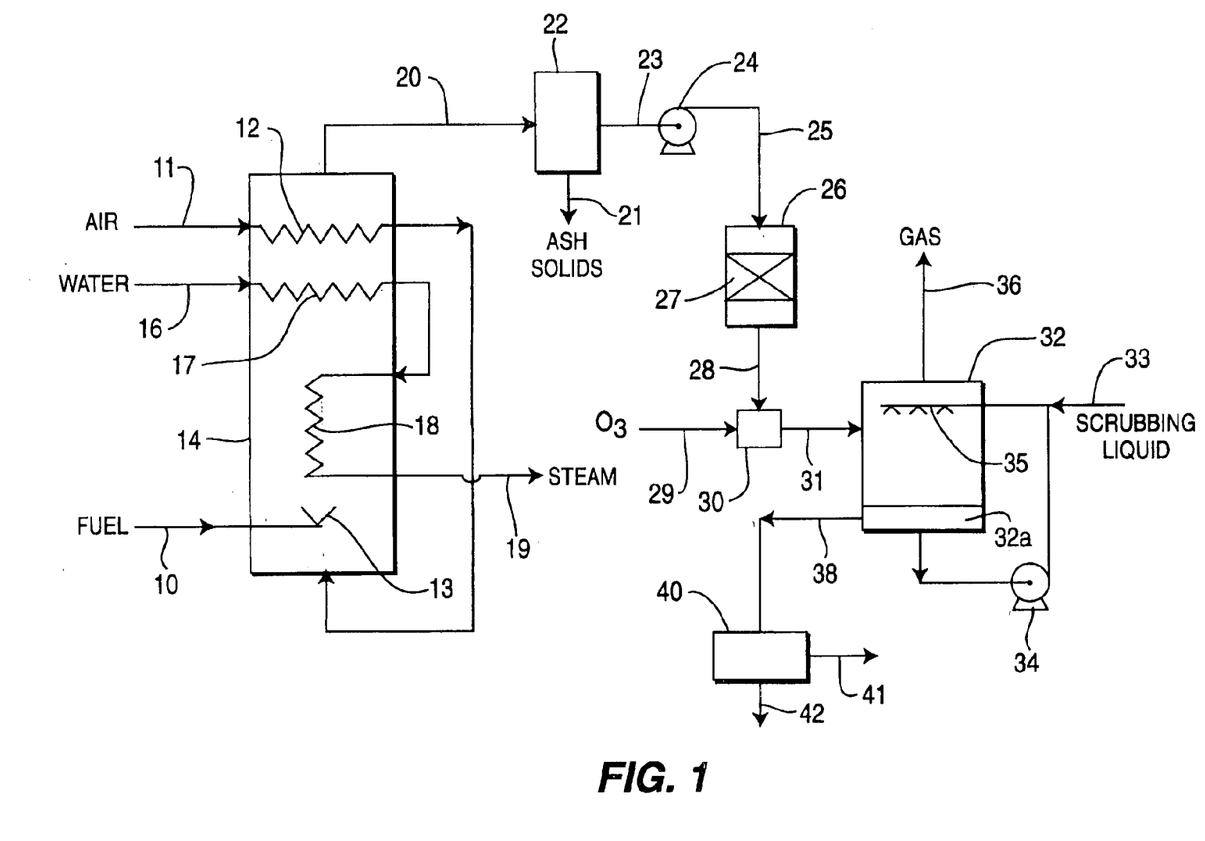
FIG. 1 is a schematic flow diagram of a process for catalytic oxidation and removal of $NO_x$ from fuel combustion gases by successive catalytic oxidation and chemical oxidation steps according to the invention.

As shown in FIG. 1, a hydrocarbon fossil fuel such as particulate coal is provided at 10, and is fed together with combustion air supplied at 11 and preheated at 12 to a burner 13 located in the lower portion of a boiler unit 14. The fuel is combusted with the preheated air in the burner 13 for heating water pressurized to 500–1500 psig and generating pressurized steam. The pressurized water is provided at 16 and preheated at 17, then is further heated and vaporized in heat exchanger 18 to produce the pressurized steam which is removed at 19.

The resulting hot flue gases containing $CO_2$, CO and some undesirable nitrogen and sulfur oxides are removed from the boiler unit 14 as stream 20 and passed through an electronic precipitator unit 22, from which fine particulate ash solids are withdrawn at 21. The resulting cleaned combustion gas stream at 23 containing up to about 0.2 vol. % $NO_x$ and 5–10 vol. % oxygen is removed by exhaust fan 24 and is passed as stream 25 at temperatures of 170–550° F. and pressure of 0.8–5.0 psig to an initial catalytic oxidation unit 26. The catalytic oxidation unit 26 has a suitable oxidation catalyst material 27 provided on inner surfaces of the oxidation unit. The catalyst 27 is preferably the bi-functional oxidation catalyst as disclosed herein above. However, other known effective oxidative catalyst materials capable of $NO_x$ oxidation at temperatures below about 550° F. could be utilized in the catalytic oxidation unit 26. The oxidation catalyst material 27 is coated/supported on a suitable geometric structure providing large surface area such as at least about 50 $m^2/gm$ and need not exceed about 500 $m^2/gm$, provides low pressure drop less than about 5 psi and preferably less than 0.5 psi for the flowing gas stream, and is capable of withstanding temperatures up to about 700° F. without significant damage.

In the catalytic oxidation unit 26, the treated flue gas stream 25 is partially oxidized by contact with the catalyst material 27, so that the $NO_x$ component contained in the flue gas stream 25 together with 5–10 vol. % oxygen is partially oxidized to form at least about 50 vol. % $NO_2$ and preferably 60–98 vol. % $NO_2$ and higher oxides. The oxidation reaction conditions in unit 26 are maintained within the ranges 170–550° F. temperature, 0.5–20 psig. static pressure, and at gas space velocity of 5,000–100,000 $hr^{-1}$. Preferred reaction conditions are 200–400° F. temperature, 1–15 psig. pressure, and gas space velocity of 8,000–50,000 $hr^{-1}$.

The resulting catalytically treated combustion gas stream at 28 containing partially oxidized $NO_x$ is mixed in chemical oxidation reactor 30 with sufficient ozone ($O_3$) gas provided at 29 such as from an ozone generator to provide further oxidation of the $NO_2$ to essentially $N_2O_5$. In the oxidation reactor 30, a molar ratio of $O_3$ to $NO_x$ is at least about 0.5:1 and need not exceed about 1:1. The gas residence time in reactor 30 is dependent on the initial concentration of the $NO_x$ and sulfur oxides and the reaction temperature, and need not exceed about 10 seconds at about 100–250° F. temperature. The $NO_x$ concentration in the chemically oxidized combustion flue gas at 31 is reduced to a desired low level as required by governmental emission control standards, such as less than about 15 ppm $NO_x$ and preferably less than 10 ppm $NO_x$.

From the chemical oxidation reactor 30, the resulting combustion gas at 31 containing essentially fully oxidized $N_2O_5$ is next scrubbed in a scrubber unit 32 against a suitable scrubbing liquid provided at 33, such as water or a lime solution. The scrubbing liquid is circulated from the scrubber unit 32 lower portion 32a of the by recycle pump 34 through a suitable liquid distributor means 35 including multiple spray nozzles provided in the scrubber 32 upper portion. Make-up scrubbing liquid is provided at 33 to the scrubber unit 32 as needed. After scrubbing, the resulting cleaned flue gas stream containing essentially no $NO_x$ is discharged at 36 to the atmosphere. A portion of the scrubber liquid containing the dissolved nitrogen oxides is withdrawn at 38 from the scrubber 32 and passed to a liquid-solids separation step at 40, from which liquids are removed at 41 and solids are withdrawn at 42 for further use or for suitable disposal.

The bi-functional catalyst of this invention will be described further by use of the following examples, which should not be construed as being limiting in scope.

EXAMPLE 1

Several bi-functional catalyst powder samples were prepared which each utilized barium, lanthanum, strontium, or zirconium as the adsorption metal ions and oxidation metals ions of copper, manganese and platinum in a molar ratio of the adsorption metal to the oxidation metals within a range 1:3 to 1:6 (0.33:1 to 0.16:1), with the platinum as a promotor metal. A precursor solution was prepared including adsorption and oxidation oxides, for which 46.9 grams of $BaCuO_2$, 52.3 g of Ba $(NO_3)_2$ and 46.5 g of Cu $(NQ_3)_2 \cdot 2.5H_2O$ are dissolved in 300 ml distilled water. Also, 76.9 g citric acid was dissolved in 200 ml distilled water. The mole ratio between the citric acid and total metal ions was 1:1. The two solutions were mixed together and water was evaporated using a rotary evaporator at 95° C. (203° F.) until a sol consistency was obtained. The sol was further dried at 750° C. (158° F.) in a vacuum oven, then it was calcined at about 750° C. (1380° F.) for 0.5 hours in air, and then cooled to provide the precursor Ba/Cu material.

This obtained Ba/Cu precursor material was further impregnated by a Mn and Pt solution, for which 12.1 grams of Mn $(NO_3)_2 \cdot 6H_2O$ was dissolved in 100 ml distilled water, and 1.2 grams 5% Pt solution (ammonia platinum nitrate) was added to the Mn solution. Then 3 grams of the Ba/Cu precursor material was impregnated by the Mn and Pt solution to provide the desired molar ratio of the adsorbent metals to the oxidation metals. The resulting slurry was heated with an infrared lamp during rotation until it was dried to a solid powder. The obtained solid powder was heated and calcined at 750° C. (1380° F.) for 0.5 hours in air, then cooled to room temperature in air to provide the bi-functional catalyst sample.

EXAMPLE 2

Another sample of the bi-functional catalyst was prepared, for which 43.30 g La $(NO_3)_2 \cdot 6H_2O$ and 18.61 g $Cu(NO_3)_{20.2.5}H_2O$ was dissolved in 150 mL distilled water. Also, 34.58 g citric acid was dissolved in 200 ml distilled water. The mole ratio between the citric acid and total metal ions was 1:1. The two solutions were mixed together, and water was evaporated using a rotary evaporator at 95° C. until a sol consistency was obtained. The sol was further dried at 100° C. in a vacuum oven to provide a solid amorphous La/Cu precursor. This precursor was heated to 750° C. at 100° C./minute rate and calcined at 750° C. for 0.5 hours in air, then cooled to room temperature in air. The precursor formed is 22 grams La $Cu_{0.8}O_{2...3}$.

Figure 4:
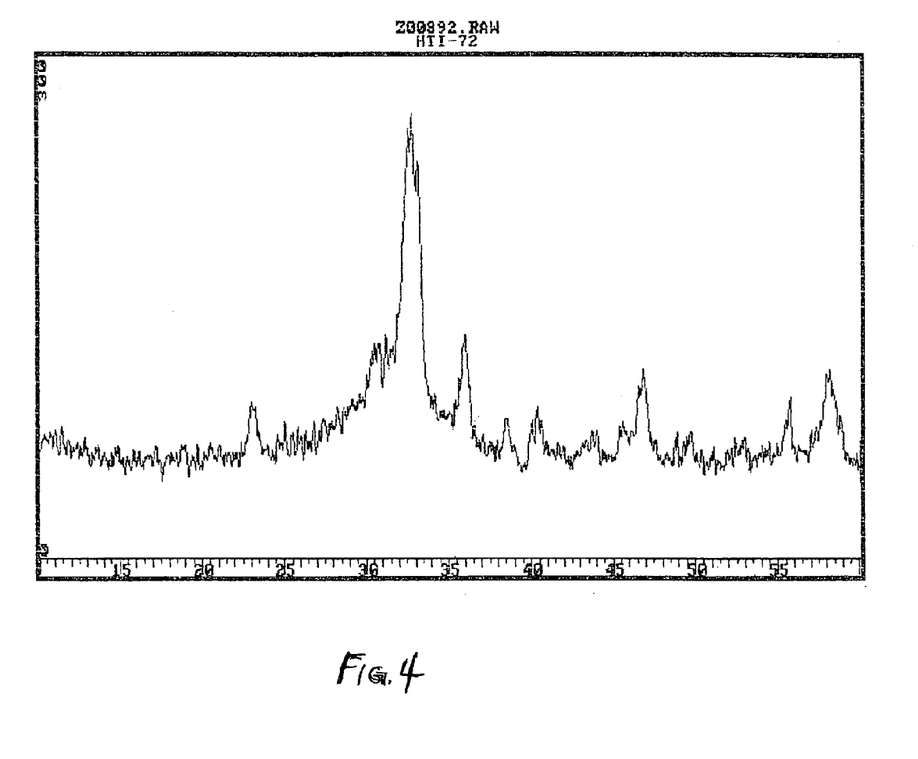
FIG. 4 is an x-ray diffraction (XRD) diagram showing the crystalline structure of a typical bi-functional catalyst made according to this invention.

This precursor was impregnated with a Mn and Pt solution, for which 22.25 grams of Mn $(NO_3)_{2.6}H_2O$ was dissolved in 100 ml distilled water. The 2.1 grams 5% Pt solution (ammonia platinum nitrate) was added to the Mn solution. 5 grams of the La $Cu_{0.8}O_{2...3}$ precursor was impregnated by this solution, the resulting slurry was dried by heating with an infared lamp during rotation, and further dried in an oven at 100° C. overnight. The solid sample was heated from 25° C. to 750° C. at 10° C./minute rate and calcined at 750° C. for 0.5 hours in air, and then cooled down to room temperature in air. This sample was examined by x-ray diffraction (XRD) and the results provided in FIG. 4 clearly showed that the catalyst sample had a crystalline structure. This sample was used as catalyst D-2 for Example 3.

EXAMPLE 3

For determining the NO conversion effectiveness of each catalyst sample, a 10 ml size tubular reactor was packed with 5.4 ml of each catalyst sample and a feed gas containing 525 ppm NO and 7.0 vol. % oxygen in nitrogen was passed through the reactor at 900 ml/minute flow rate and at a pressure range of 0–20 psig. The catalyst sample compositions and their molar ratios of adsorption metal to oxidation metals, reaction temperatures, and the resulting volume percentage NO conversion to $NO_2$ or higher oxides are listed below in Table 1:

TABLE 1

CATALYTIC OXIDATION OF NO TO $NO_2$

| Catalyst Designation | Catalyst Composition and Molar Ratios | Reactor Temperature, ° F. | NO Conversion to $NO_2$, Vol % |
|---|---|---|---|
| A. | 49.5% $BaCuO_2$/49.5% $MnO$/1% $PtO_2$ Ba:(Cu + Mn) = 1:4.3 | 510 | 92 |
| | | 488 | 89 |
| | | 465 | 74 |
| | | 419 | 66 |
| | | 377 | 57 |
| | | 341 | 47 |
| | | 287 | 41 |
| B. | 49.5% $BaCuO_2$/49.5% $CuO$/1% $PtO_2$ Ba:Cu = 1:3.9 | 423 | 99 |
| | | 398 | 92 |
| | | 388 | 88 |
| | | 352 | 51 |
| C. | 49.5% $SrCuO_2$/49.5% $MnO$/1% $PtO_2$ Sr:(Cu + Mn) = 1:3.7 | 522 | 87 |
| | | 462 | 71 |
| | | 387 | 51 |
| | | 318 | 19 |
| D. | 49.5% $LaCuO_{2.5}$/49.5 $MnO$/1% $PtO_2$ La:(Cu + Mn) = 1:4.4 | 525 | 92 |
| | | 505 | 93 |
| | | 477 | 95 |
| | | 455 | 95 |
| | | 425 | 94 |
| | | 374 | 86 |
| | | 324 | 77 |
| | | 273 | 72 |
| | | 222 | 67 |
| | | 172 | 62 |
| E. | 49.5% $ZrCuO_3$/49.5% $MnO$/1% $PtO_2$ Zr:(Cu + Mn) = 1:3.9 | 508 | 77 |
| | | 466 | 63 |
| | | 406 | 45 |
| | | 363 | 31 |
| | | 314 | 21 |

Figure 2:
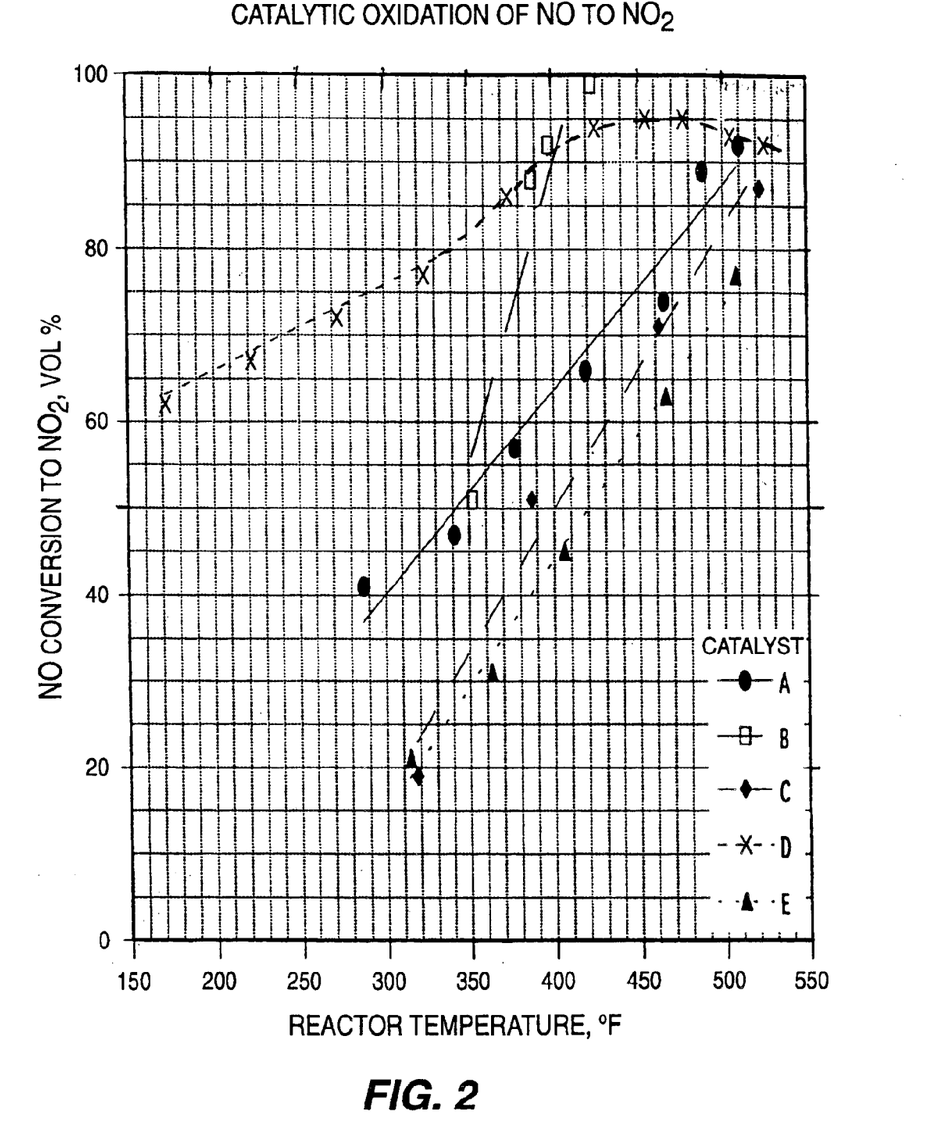
FIGS. 2 and 3 are graphs showing catalytic conversion of NO to $NO_2$ and/or higher oxides utilizing various bi-functional catalyst compositions according to this invention.

These NO conversion to $NO_2$ results are also shown in graphical form in FIG. 2.

From the results provided in Table 1 and FIG. 2, it is seen that for these bi-functional catalyst samples designated A–E having the adsorption and oxidation metal oxides each provided in intimate contact and balanced molar ratio within the desired molar ratio range of about 1:3.7 to 1:4.4 and at reaction temperatures of 170–525° F., the volume percent of NO conversion to $NO_2$ and higher oxides of nitrogen generally increases directly with increased reaction temperature up to about 500° F. and then may decline slightly. Also, nitric oxide (NO) conversions to $NO_2$ above about 50 vol. % are achieved at catalytic reaction temperatures within the range of 170–525° F. depending upon the particular catalyst composition. The most effective bi-functional catalyst was catalyst sample D which utilized La, Cu and Mn in molar ratio La: $(Cu^+ Mn)$ of about 1:4.4, and achieved conversions of NO to $NO_2$ of 95 vol. % at 425–480° F. temperature.

EXAMPLE 4

Because the NO conversion to $NO_2$ results for the bi-functional catalyst sample D utilizing 49.5% La $CuO_{2.5}$/49.5% MnO/1% $PtO_2$ were generally better than for the other catalyst compositions, additional samples were prepared and examined for which the relative amounts of La, Cu, and Mn were varied. Several additional experimental runs were made at the same reaction conditions as for Example 3. The molar ratios of La to Cu+Mn, the reaction temperatures, and the conversion results of NO oxidation to $NO_2$ are shown in Table 2 below, and are shown in graphical form by FIG. 3.

TABLE 2

CATALYTIC OXIDATION OF NO TO $NO_2$

| Catalyst Designation | Catalyst Composition And Molar Ratios | Reactor Temperature, ° F. | NO Conversion to $NO_2$, Vol % |
|---|---|---|---|
| D-1 | 49.5% $LaCu_{0.6}O_{2.1}$/49.5% MnO/1% $PtO_2$ La:(Cu + Mn) = 1:3.5 | 519 | 93 |
| | | 469 | 95 |
| | | 419 | 95 |
| | | 369 | 91 |
| | | 319 | 83 |
| | | 270 | 76 |
| | | 220 | 68 |
| | | 170 | 58 |
| D-2 | 49.5% $LaCu_{0.8}O_{2.3}$/49.5% MnO/1% $PtO_2$ La:(Cu + Mn) = 1:4.0 | 527 | 91 |
| | | 477 | 95 |
| | | 427 | 96 |
| | | 376 | 93 |
| | | 326 | 88 |
| | | 275 | 83 |
| | | 224 | 77 |
| | | 173 | 68 |
| D-3 | 49.5% $LaCu_{1.2}O_{2.7}$/49.5% MnO/1% $PtO_2$ La:(Cu + Mn) = 1:4.8 | 519 | 94 |
| | | 469 | 95 |
| | | 419 | 93 |
| | | 370 | 87 |
| | | 320 | 80 |
| | | 270 | 73 |
| | | 220 | 66 |
| | | 170 | 58 |
| D-4 | 47 $LaCu_{0.8}O_{2.3}$/52% MnO/1% $PtO_2$ La:(Cu + Mn) = 1:4.3 | 525 | 91 |
| | | 475 | 95 |
| | | 426 | 94 |
| | | 375 | 87 |
| | | 325 | 79 |
| | | 274 | 71 |
| | | 223 | 64 |
| D-5 | 55 $LaCu_{0.8}O_{2.3}$/44% MnO/1% $PtO_2$ La:(Cu + Mn) = 1:4.3 | 519 | 92 |
| | | 469 | 94 |
| | | 419 | 91 |
| | | 369 | 84 |
| | | 319 | 75 |
| | | 269 | 68 |
| | | 220 | 62 |
| D-6 | 43% $LaCuO_{2.5}$/56% MnO/1% $PtO_2$ La:(Cu + Mn) = 1:5.4 | 519 | 92 |
| | | 469 | 95 |
| | | 419 | 93 |
| | | 369 | 85 |

TABLE 2-continued

CATALYTIC OXIDATION OF NO TO $NO_2$

| Catalyst Designation | Catalyst Composition And Molar Ratios | Reactor Temperature, ° F. | NO Conversion to $NO_2$, Vol % |
|---|---|---|---|
| D-7 | 52% $LaCuO_{2.5}$/47% MnO/1% $PtO_2$ La:(Cu + Mn) = 1:4.1 | 319 | 75 |
| | | 527 | 93 |
| | | 474 | 96 |
| | | 424 | 95 |
| | | 374 | 90 |
| | | 323 | 84 |
| | | 273 | 78 |
| | | 223 | 72 |
| | | 172 | 62 |

Figure 3:
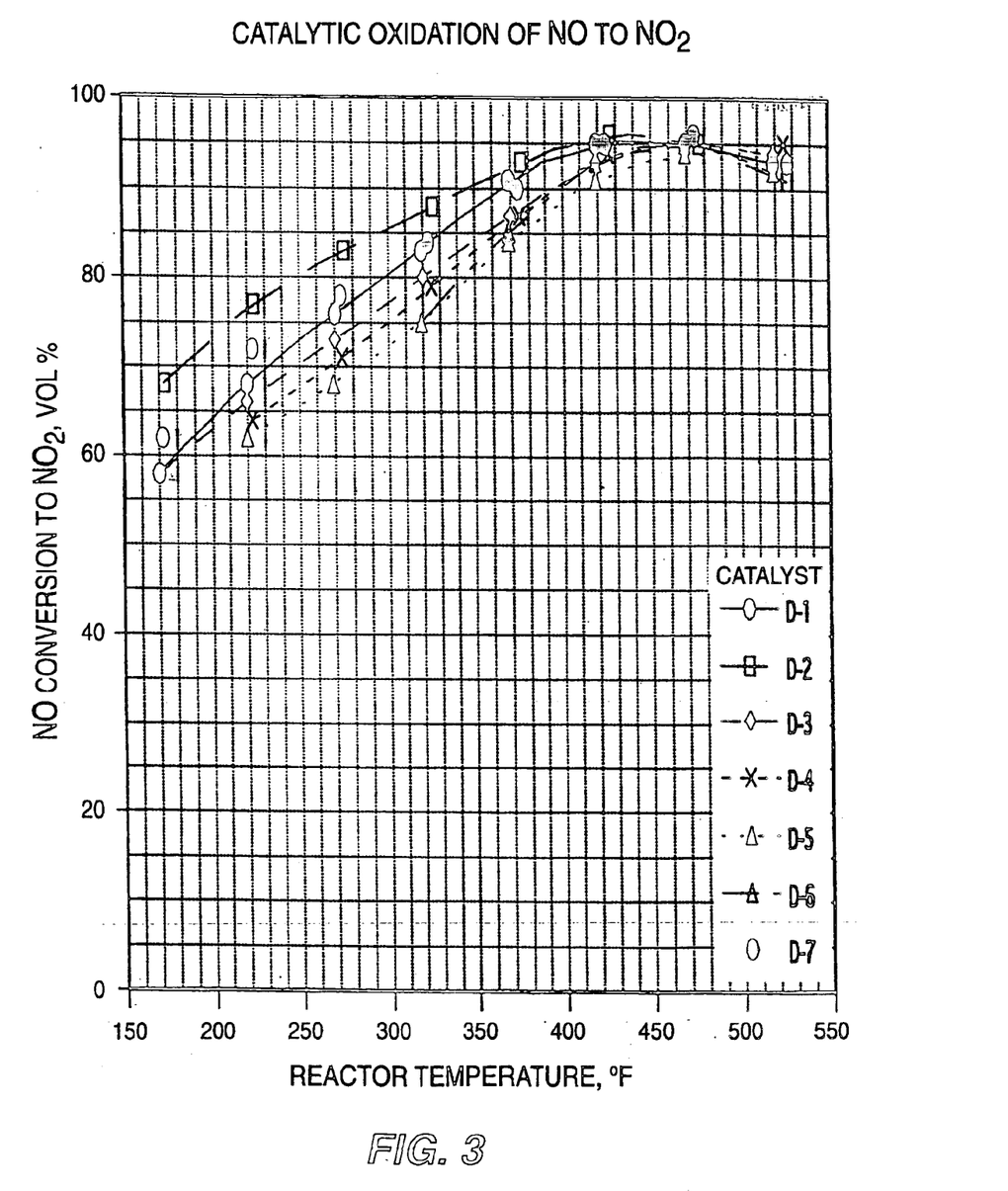

From the above results provided in Table 2 and FIG. 3, it is seen that the percentage NO conversion to $NO_2$ increased rather directly with increased temperature up to about 90–95 vol. % at 350–500° F. and then declined slightly. The most effective bi-functional catalyst combination of La CuO and MnO was sample D-2 having composition of 49.5% La $Cu_{0.8} O_{2.3}$/49.5% MnO/1% Pt $O_2$ and a molar ratio of La:(Cu+Mn) in the range of 1:4.0.

Although the bi-functional oxidation catalyst material and process for utilizing the catalyst of this invention for $NO_x$ oxidation and removal have been described broadly and also in terms of preferred catalyst composition and also catalytic oxidation process steps and reaction conditions, it is understood that modifications and variations can be made all within the scope of the invention as defined by the following claims.

We claim:

1. A bi-functional catalyst useful for oxidation and removal of nitrogen oxides (NOx) contained in fuel combustion gases, the catalyst comprising:

an adsorption function metal oxide component comprising at least one metal oxide selected from the group consisting of oxides of barium, cesium, lanthanum, strontium, and zirconium, wherein said adsorption metal oxide component includes lanthanum, said adsorption function metal oxide component providing adsorption function and adsorption sites for nitrogen oxides in fuel combustion gases; and an oxidation function metal oxide component comprising at least one metal oxide selected from the group consisting of chromium, cobalt, copper, iron, manganese, and platinum, wherein said oxidation metal oxide component includes at least one of copper or manganese promoted with platinum, said oxidation function metal oxide component providing an oxidation function and oxidation sites for nitrogen oxides in fuel combustion gases, said adsorption metal oxide component and said oxidation metal oxide component being combined together in close intimate contact so that said adsorption metal oxide component and said oxidation metal oxide component are chemically bonded closely together so as to form a metal oxide complex having a crystalline structure, said adsorption sites and oxidation sites for nitrogen oxides within the bi-functional catalyst being adjacent to each other and arranged so as to promote adsorption and oxidation of nitrogen oxides when exposed to fuel combustion gases containing nitrogen oxides, the molar ratio of metal within the adsorption function metal oxide component to metal within the oxidation function metal oxide component being in a ratio range of 0.1:1 to 5:1 in the bi-functional catalyst.

2. The bi-functional catalyst of claim 1, wherein said oxidation function metal oxide component includes copper, manganese, and platinum, and the molar ratio of metal within the adsorption function metal oxide component to metal within the oxidation function metal oxide component is in range of about 0.2:1 to 2:1.

3. The bi-functional catalyst of claim 1, wherein said adsorption function metal oxide component includes barium (Ba), and said metal oxide oxidation component includes copper (Cu) and manganese (Mn) promoted with platinum (Pt).

4. The bi-functional catalyst of claim 1, wherein said adsorption metal oxide component includes barium (Ba), and said oxidation metal oxide component includes copper (Cu), and optionally manganese (Mn), promoted with platinum (Pt).

5. The bi-functional catalyst of claim 1, wherein said bi-functional catalyst is provided on a porous support material having surface area of at least about 50 $m^2/g$.

6. A bi-functional catalyst useful for oxidation and removal of nitrogen oxides (NOx) contained in fuel combustion gases, the catalyst comprising:
an adsorption function metal oxide component comprising lanthanum and providing adsorption function and adsorption sites nitrogen oxides in fuel combustion gases; and
an oxidation function metal oxide component comprising at least one of copper or manganese promoted with platinum and providing oxidation function and oxidation sites for nitrogen oxides in fuel combustion gases,
said adsorption metal oxide component and said oxidation metal oxide component being combined intimately together so that said adsorption metal oxide component and said oxidation metal oxide component are chemically bonded closely together so as to form a metal oxide complex having a crystalline structure,
said adsorption sites and oxidation sites for nitrogen oxides within the bi-functional catalyst being adjacent to each other and arranged so as to promote adsorption and oxidation of nitrogen oxides when exposed to fuel combustion gases containing nitrogen oxides,
the molar ratio of metal within the adsorption function metal oxide component to metal within the oxidation function metal oxide components being in a range of 1.2:1 to 2:1,
said metal oxide components being provided on a porous inert support material having surface area of 50–500 $m^2/g$.

7. A method for making a bi-functional catalyst suitable for catalytic oxidation of nitrogen oxides (NOx) contained in fuel combustion gases, comprising:
(a) providing an aqueous solution of adsorption function metal ions selected from the group consisting of barium, cesium, lanthanum, strontium, and zirconium and combinations thereof for providing an adsorption function and adsorption sites in the bi-functional catalyst for adsorbing nitrogen oxide contained in combustion gases;
(b) providing an aqueous solution of oxidation function metal ions selected from the metals group consisting of chromium, cobalt, copper, iron, manganese and platinum for providing an oxidation function and oxidation sites for in the bi-functional catalyst oxidizing nitrogen oxides in combustion gases,
said adsorption function metal ions having a molar ratio to the oxidation function metal ions in the range of 0.1:1 to 5:1;
(c) mixing said absorption and oxidation function metal ion solutions together and adding a binding agent acid having at least two functional groups selected for providing close intimate contact of said metal ions to form a precursor solution;
(d) drying said precursor solution and heating to a temperature of 500–800° C. (930–1470° F.) to form a metal oxide complex precursor material, then cooling the metal oxide complex precursor material; and
(e) forming a second solution of oxidation function metal ions and a platinum salt, and impregnating said precursor material with said second solution, then drying and calcining the impregnated material at 500–800° C. temperature and cooling to yield the bi-functional catalyst.

8. The method for making a bi-functional catalyst of claim 7, wherein the binding agent acid comprises carboxylic acid having a molar ratio of acid to total metals in a range of 0.5:1 to 2:1.

9. The method for making a bi-functional catalyst of claim 8, wherein the carboxylic binding acid comprises citric acid.

10. The method for making a bi-functional catalyst of claim 8, wherein the carboxylic binding acid comprises sodium citrate.

11. A method for making a bi-functional catalyst suitable for catalytic oxidation oxides (NOx) contained in fuel combustion gases, comprising:
(a) providing an aqueous solution of adsorption function metal ions selected from the group consisting of barium (Ba) and lanthanum (La) for providing an adsorption function and adsorption sites in the bi-functional catalyst for adsorbing nitrogen oxides contained in combustion gases;
(b) providing an aqueous solution of oxidation function metal ions selected from the metals group consisting of copper (Cu) and manganese (Mn) for providing an oxidation function and oxidation sites in the bi-functional catalyst for oxidizing nitrogen oxides contained in combustion gases,
said absorption function metal ions having a molar ratio to the oxidation function metal ions in the range of 0.1:1 to 5:1;
(c) mixing said absorption and oxidation function metal ion solutions together and adding a binding agent acid having at least two functional groups for providing close intimate contact of said metal ions to form a precursor solution;
(d) drying said precursor solution and heating to a temperature of 500–800° C. (930–1470° F.) to form a metal oxide complex precursor material, then cooling the metal oxide complex precursor material; and
(e) forming a second solution of oxidation function metal ions comprising manganese (Mn) ions and a platinum (Pt) salt, and impregnating said metal oxide complex precursor material with the second solution, then drying and calcining the impregnated precursor material at 500–800° C. temperature and cooling to yield the bi-functional catalyst.

12. The method for making a bi-functional catalyst of claim 11, wherein said adsorption function metal ions comprise barium (Ba).

13. The method for making a bi-functional catalyst of claim 11, wherein said adsorption function metal ions comprise lanthanum (La).

14. The method for making a bi-functional catalyst of claim 11, wherein said adsorption function metal ions comprise barium (Ba) and said oxidative function metal ions comprise copper (Cu) and manganese (Mn) promoted with platinum (Pt).

15. The method for making a bi-functional catalyst of claim 7, including depositing the catalyst in powder form onto a porous support material.

16. A process for catalytic oxidation and removal of nitrogen oxides (NOx) contained in fuel combustion gases, the process comprising:
(a) providing a combustion gas stream containing nitrogen oxides (NOx) together with oxygen; and
(b) contacting said combustion gas stream with the bi-functional oxidation catalyst of claim 1 in order for said catalyst to adsorb and oxidize at least a portion of the nitrogen oxides (NOx) in said combustion gas stream at a temperature in a range of 170–550° F., a pressure in a range of 0.5–20 psig, and a space velocity in a range of 5,000–100,000 $hr^{-1}$ to form higher oxides of nitrogen and thereby yield a treated combustion gas stream containing partially oxidized nitrogen oxides (NOx).

17. The catalytic oxidation process of claim 16, wherein said combustion gas stream contains up to 0.5 vol. % nitrogen oxides (NOx).

18. The catalytic oxidation process of claim 16, wherein said combustion gas stream in (b) has a temperature in a range 200–500° F., pressure in a range of 1–15 psig, and a space velocity in a range of 8,000–50,000 $h^{-1}$, and wherein the nitrogen oxides (NOx) in the treated combustion gas stream comprises at least about 50 vol % $NO_2$.

19. The catalytic oxidation process of claim 18, wherein the nitrogen oxides (NOx) in the treated combustion gas stream contains 60–98 vol % $NO_2$.

20. The catalytic oxidation process of claim 16, wherein said combustion gas stream contains up to 0.2 vol. % NOx.

21. The catalytic oxidation process of claim 16, further comprising:
(c) contacting said treated gas stream containing partially oxidized nitrogen oxides (NOx) with a chemical oxidant having a molar ratio of said chemical oxidant to nitrogen oxides (NOx) in a range of 0.5:1 to 1.2:1 to further oxidize the partially oxidized nitrogen oxides (NOx) to higher oxides of nitrogen; and
(d) scrubbing the treated combustion gas stream containing the higher oxides of nitrogen with a scrubbing liquid to remove the higher oxides of nitrogen from the treated combustion gas and yield a further treated combustion gas stream containing less than about 15 ppm nitrogen oxides (NOx).

22. The catalytic oxidation process of claim 21, wherein (c) is performed at a temperature in a range of 100–250° F. and a pressure in a range of 0.8–1.4 psig.

23. The catalytic oxidation process of claim 21, wherein said chemical oxidant comprises ozone ($O_3$), and wherein the molar ratio of the ozone ($O_3$) to the nitrogen oxides (NOx) in said treated combustion gas stream is 0.8:1 to 1.0:1.

24. The catalytic oxidation process of claim 21, wherein said scrubbing liquid comprises water.

25. The catalytic oxidation process of claim 21, wherein (b) is performed at a temperature in a range of 300–350° F.

26. The catalytic oxidation process of claim 21, wherein the further treated combustion gas stream formed in (d) contains less than about 10 ppm nitrogen oxides (NOx).

27. A bi-functional catalyst useful for oxidation and removal of nitrogen oxides (NOx) contained in fuel combustion gases, the catalyst comprising:
an absorption function metal oxide component comprising lanthanum oxide and optionally at least one other metal oxide selected from the group consisting of oxides of barium, cesium, strontium, and zirconium and providing adsorption function and adsorption sites for nitrogen oxides in fuel combustion gases; and
an oxidation function metal oxide component comprising at least one of copper or manganese promoted with platinum and optionally at least one other metal oxide selected from the group consisting of chromium, cobalt, iron, and platinum and providing an oxidation function and oxidation sites for nitrogen oxides in fuel combustion gases,
said adsorption metal oxide component and said oxidation metal oxide component being combined together in close intimate contact by means of an intermediate aqueous solution, comprising (i) at least type of adsorption function metal ions, (ii) at least one type of oxidation function metal ions, and (iii) a binding acid agent, that is heated and dried in order for said adsorption and oxidation metal oxide components to be chemically bonded closely together so as to form a metal oxide complex having a crystalline structure,
the molar ratio of the adsorption function metal ions to the oxidation function metal ions in the intermediate aqueous solution being in a range of 0.1:1 to 5:1.

28. A bi-functional catalyst useful for oxidation and removal of nitrogen oxides (NOx) contained in fuel combustion gases, the catalyst comprising:
an adsorption function metal oxide component comprising at least one metal oxide selected from the group consisting of oxides of barium, cesium, lanthanum, strontium, and zirconium; and
an oxidation function metal oxide component comprising at least one metal oxide selected from the group consisting of chromium, cobalt, copper, iron, manganese, and platinum,
said adsorption metal oxide component and said oxidation metal oxide component being combined together in close intimate contact so that said adsorption metal oxide component and said oxidation metal oxide component are chemically bonded closely together so as to form a metal oxide complex having a crystalline structure,
the molar ratio of metal in the adsorption function metal oxide component to metal in the oxidation function metal oxide component being in a range of 1:3 to 1:6.

* * * * *

UNITED STATES PATENT AND TRADEMARK OFFICE
CERTIFICATE OF CORRECTION

PATENT NO.   : 6,875,409 B1
DATED         : April 5, 2005
INVENTOR(S)  : Zhou et al.

It is certified that error appears in the above-identified patent and that said Letters Patent is hereby corrected as shown below:

Column 1,
Line 14, after "exhaust" change "gases," to -- gases. --

Column 2,
Line 45, change "Metals oxides" to -- Metal oxides --
Line 62, after "methods" insert -- and --

Column 4,
Line 41, before "range" change "the" to -- in a --

Column 7,
Line 23, after "oxidation" change "metals" to -- metal --
Line 30, change "Cu(NQ$_3$)$_2$•2.5H$_2$0" to -- Cu(NO$_3$)$_2$•2.5H$_2$0 --
Line 56, after "La(NO$_3$)$_2$•6H$_2$0" remove ")"
Line 57, change "Cu(NO$_3$)$_{20.2.5}$H$_2$0" to -- Cu(NO$_3$)$_2$•2.5H$_2$0 --

Column 8,
Line 2, change "Mn(NO$_3$)$_2$•$_6$H$_2$0" to -- Mn(NO$_3$)$_2$•6H$_2$0 --

Column 11,
Line 51, change "1.2:1" to -- 0.2:1 --

Column 12,
Line 2, before "the bi-functional" remove "in"
Line 31, after "catalytic oxidation" insert -- of --

Column 13,
Line 31, before "200-500° F.," insert -- of --
Line 31, before "pressure" insert -- a --
Line 34, after "stream" change "comprises" to -- comprise --
Line 37, after "stream" change "contains" to -- contain --

UNITED STATES PATENT AND TRADEMARK OFFICE
CERTIFICATE OF CORRECTION

PATENT NO.    : 6,875,409 B1
DATED         : April 5, 2005
INVENTOR(S)   : Zhou et al.

It is certified that error appears in the above-identified patent and that said Letters Patent is hereby corrected as shown below:

<u>Column 14,</u>
Line 10, change "absorption function" to -- adsorption function --

Signed and Sealed this

Twelfth Day of July, 2005

JON W. DUDAS
*Director of the United States Patent and Trademark Office*